United States Patent Office 3,726,846
Patented Apr. 10, 1973

3,726,846
POLYMERISATION OF STYRENE AND SIMILAR MONOMERS USING A CONTINUOUSLY INCREASING TEMPERATURE CYCLE
John Mansel Squire, Dollar, Scotland, and Geoffrey James Gammon, Ashford, England, assignors to The British Petroleum Company Limited, London, England
No Drawing. Filed June 9, 1970, Ser. No. 45,251
Int. Cl. C08f 7/04, 7/06
U.S. Cl. 260—86.7   11 Claims

ABSTRACT OF THE DISCLOSURE

An olefin, particularly styrene, is polymerised, using a continuously programmed temperature rise in the range 50–150° C. and at least three initiators having half lives of 1–15 hours at 70° C. and less than 1 hour at 100° C., 1–15 hours at 100° C. and 1–4 hours at 115° C., and greater than 15 hours at 100° C. and 0.1 to 10 hours at 130° C. The invention is particularly applicable to a suspension process.

---

This invention relates to a process for the polymerisation of olefinically unsaturated compounds in the presence of free radical catalysts.

U.S. Pat. 2,907,756 discloses a three stage process for the polymerisation of styrene using a two component initiator system and a "stepwise" heating cycle in which the reaction temperature is raised from 90° to 135° C. in three separate stages: stage 1—the temperature is maintained at 90°–100° C. for two-three hours: stage 2—the temperature is raised to 115° C. and is maintained at this temperature for two hours: stage 3—the temperature is raised to 135° C. and is maintained at this temperature for one hour.

The overall cycle times is 7 hours.

Dutch patent application 6703601 discloses a three stage process for the polymerisation of vinyl hydrocarbons using a three component initiator system, the half life of the first component at 100° C. in benzene being 3–10 minutes, that of the second under the same conditions being 15–60 minutes and that of the third 100–2000 minutes. Each stage is carried out at constant temperature, the second and third stages being carried out at higher temperatures than the preceding one. For the polymerisation of a styrene, the first stage is preferably effected at 50–80° C., the second at 80°–100° C. and the third at 100°–120° C. It is stated that the polymerisation of styrene can be effected in 10 hours instead of 14.

In a "stepwise" cycle, there will be a progressive reduction in polymerisation rate along a given temperature plateau as the concentration of the initiator which is operating at that stage decreases. For instance, from the heating cycle and conversion-time relationship given in U.S. Pat. 2,907,756 (FIGS. 2 and 3) it is apparent that there was a reduction in polymerisation rate at 100° C. from 19% per hour (in the second hour) to 9% per hour (in the third hour of the cycle) which corresponded with the diminishing benzoyl peroxide concentration during that period. It is not possible, therefore, to accomplish constant polymerisation rates by the use of a two initiator/"stepwise" cycle of the type disclosed by U.S. Pat. 2,907,756.

In the process disclosed by Dutch patent application 6703601 it is claimed that the relative proportions of the first and second components of the initiator system and the polymerisation temperatures are chosen in such a way that the speed of polymerisation remains the same before and after the participation in the reaction of the second catalyst.

We have now discovered that by using a three component initiator system and a programmed heating cycle in which the temperature is continuously increased it is possible to produce high quality polymers using considerably shorter cycle times than those hitherto thought necessary. Cycle times of the order of 3½–4 hours or less are possible.

Thus according to the present invention there is provided a process for the polymerisation of an olefinically unsaturated monomer which process comprises polymerising the monomer in the presence of an initiator system having at least three components under a continuously increasing programmed temperature cycle in the range 50 to 150° C., the first component having a half life of 1–15 hours at 70° C. and less than 1 hour at 100° C., the second having a half life of 1–15 hours at 100° C. and 1–4 hours at 115° C. and the third having a half life of greater than 15 hours at 100° C. and 0.1–10 hours at 130° C. The half life times being measured in benzene.

Suitable first components include lauroyl peroxide, octanoyl peroxide, 2,4-dichlorobenzoyl peroxide and benzoyl peroxide.

Suitable second components include 1,1,di-t-butyl peroxy-3, 5,5-trimethyl cyclohexane (sold under the trade name "Trigonox 29–B.50"), t-butyl peracetate, cyclohexanone peroxide and t-butyl peroxyisopropyl carbonate.

Suitable third components include t-butyl perbenzoate, dicumyl peroxide, di-t-butyl peroxide and di-t-butyl perphthalate.

The required concentrations of the components of the initiator system may be determined by simple small scale kinetic experiments.

Preferably the programmed temperature ranges from 70° to 140° C., most preferably from 90° to 135° C.

Suitable monomers includes styrene, ortho- and para-monochloro-styrenes, dichloro-styrenes, vinyl naphthalene, acrylic acid derivatives such as methylacrylate and ethylacrylate, and vinyl acetate.

A small amount of divinyl benzene may be copolymerised with the monomer. This will normally increase the molecular weight of the product.

The programmed temperature cycle of this invention can be used in any suspension polymerisation step, for example for the second stage polymerisation of a rubber reinforced polystyrene or ABS where prepolymerisation is carried out in bulk until phase inversion has taken phase.

By the process according to the present invention, the initiator system can be tailored to fit a given heating cycle, the duration of which is governed by the heat transfer characteristics of the reactors for which the cycles are designed. This is in contrast to previous processes, in which the initiators are first chosen and the cycle times are dependent on the chosen initiators.

In commercial operations for the production of polystyrene, the problem of heat transfer from within polymerisation vessels may be alleviated somewhat by performing the polymerisation in aqueous suspension (suspension process); the heat transfer capabilities of the reactor will govern the maximum polymerisation rate which can be controlled with safety.

The present invention is particularly applicable to a suspension process although it need not be limited to such.

Conventional ingredients of suspension polymerisation recipes may be added, e.g. suspending agents and wetting agents.

Suitable suspending agents include water soluble protective colloids such as polyvinyl alcohol, hydroxyethyl cellulose, hydroxy propyl starch, styrene-maleic anhydride copolymers, and polyvinyl pyrrolidone, and finely divided inorganic solids which are substantially insoluble in water such as hydroxyapatite, calcium phosphate, calcium carbonate and zinc oxide.

Suitable wetting agents include anionic surface active agents such as sodium caproate and sodium oleate, organic sulphates and sulphonates such as long chain alkyl sulphates and sulphonates, alkyl aromatic sulphonates, aryl alkyl polyether sulphonates, sodium salts of alkyl phosphates and the reaction product of tertiary butyl hydroperoxide and sodium formaldehyde sulphoxylate.

Further ingredients such as white mineral oil and stearic acid may also be added.

Preferably the reaction temperature is steadily increased at a predetermined linear rate such that the declining activity of a given initiator is counteracted by the increasing temperature. In this manner, by choice of balanced initiator concentrations and combinations, it is possible to maintain a constant polymerisation rate up to 90–95% conversion.

In view of the inverse relationship between the degree of polymerisation and the polymerisation rate it might appear that products from these shorter cycles would have a lower molecular weight compared with products from cycles in which lower polymerisation rates are employed. This is not the case, however, and products of satisfactory molecular weight are obtained. A small amount of divinylbenzene as comonomer will raise molecular weight if desired. In addition, polymers of low residual monomer content (less than 0.4%) can be produced without a prolonged period of heating of the reaction mixture at relatively high temperatures, e.g., 135° C. This is advantageous since it is known that sugar-crust formation, i.e., late-stage suspension failure, may occur if certain suspension systems are exposed to high temperatures (greater than 130° C.) for moderate periods of time.

As a further advantage of the present invention, it is not necessary to remove so much heat from the reaction mixture by external cooling, since the heat of polymerisation may be usefully employed to raise the temperature of the reaction medium according to the predetermined time-temperature cycle.

The invention is illustrated by the following examples.

EXAMPLE 1

In this example, details are given of a small-scale kinetic run which was carried out to determine the conversion-time relationship for the suspension polymerisation described in Example 2.

A solution of the three initiators in styrene (200 ml.) was prepared using the following concentrations:

Benzoyl peroxide (75%), 0.52 g. (0.20%)
1,1-di-t-butyl peroxy-3,5,5-trimethyl cyclohexane (50%— in dibutyl phthalate), 0.16 g. (0.04%)
(Trigonox 29–B.50)
t-Butylperbenzoate (95%), 0.11 g. (0.05%)

Aliquots (ca. 20 ml.) of this solution were transferred to small thin-walled Pyrex glass tubes by means of a syringe. The tubes were deaerated and were transferred to an oil-bath which could be accurately temperature programmed throughout the required cycle (90–135° C. (linearly) over 4 hours).

Reactor tubes were removed from the oil-bath at intermediate levels of conversion (after 1, 2, 3 and 4 hours) and their polymer contents, and hence the degrees of conversion, were determined. These results have been summarized below (Table 1).

TABLE 1

| Polymerisation time, hr. | Temperature, °C. | Conversion, percent |
| --- | --- | --- |
| 1 | 101 | 31.6 |
| 2 | 112.5 | 68.0 |
| 3 | 124 | 95.8 |
| 4 | 135 | 99.8 |

EXAMPLE 2

This example gives details of a suspension polymerisation which was carried out using the initiator combination described in Example 1.

A catalyst composition comprising benzoyl peroxide (0.20 percent), Trigonox 29–B.50 (0.04 percent), and t-butylperbenzoate (0.05 percent) (all percentages quoted refer to actual initiator percentages on styrene monomer) was added to 50 kg. of an aqueous suspension of styrene monomer (monomer/water weight ratio 1.39) containing a white mineral oil lubricant (620 g.).

The suspension was stabilised by means of an hydroxy apatite suspension system. Stearic acid was added to the mixture to act as mould-release agent in the product.

The temperature of the agitated polymerization mixture was raised from 90° to 135° C. (linearly) over a period of 4 hours. The suspension slurry was allowed to cool to room temperature and the polymer beads were washed first with dilute hydrochloric acid solution and then with water. The product was dried at ca. 75° C. for 2 hours. Some properties of the product are shown in Table 2.

TABLE 2

Product properties:
Residual monomer content, percent _____ 0.15
Solution viscosity (1% solution in toluene at 25° C.), centipoises _____ 1.05
$M_W^-$ (GPC) ($\times 10^{-5}$) _____ 2.73
Tensile strength at yield, p.s.i. _____ 6252
Elongation at break, percent) _____ 2.4
Impact strength (ft. lb./in. notch) _____ 0.24
Softening point, °C. _____ 92.2
Melt flow index (5 kg., 200° C.), g./10 min. _ 15.0

EXAMPLE 3

A kinetic run was carried out according to the procedure described in Example 1 except that the initiator concentrations were modified and the heating cycle was 90–135° C. (linearly programmed)/3½ hours. The initiator concentrations were: benzoyl peroxide (0.20 percent), Trigonox 29–B.50 (0.04 percent), and t-butylperbenzoate (0.06 percent). All concentrations are quoted as percentage by weight on styrene. The results have been summarized in Table 3.

TABLE 3

| Polymerisation time, hr. | Temperature, °C. | Conversion, percent |
| --- | --- | --- |
| 1 | 103 | 33.8 |
| 2 | 116 | 68.0 |
| 3 | 129 | 96.6 |
| 3½ | 135 | 99.6 |

EXAMPLE 4

A suspension polymerisation was carried out according to the procedure described in Example 2, except that the polymerization cycle and initiator concentrations were based on those employed in Example 3. Some properties of the product have been given in Table 4.

TABLE 4

Product properties:
Residual monomer content, percent _____ 0.35
Solution viscosity (1% solution in toluene at 25° C.), centipoises _____ 1.07
$M_W^-$ (GPC) ($\times 10^{-5}$) _____ 2.83
Tensile strength at yield, p.s.i. _____ 6000
Elongation at break, percent _____ 2.7
Impact strength (ft. lb./in. notch) _____ 0.30
Softening point, °C. _____ 91.0
Melt flow index (5 kg., 200° C.), g.10 min. __ 17.1

We claim:
1. A process for the polymerisation of an olefinically unsaturated monomer selected from the group consisting of styrene, ortho-chlorostyrene, para-chlorostyrene, di- chlorostrenes, vinyl naphthalene, methyl acrylate and ethyl acrylate which process comprises polymerising said olefinically unsaturated monomer in the presence of an organic peroxy initiator system having at least three components under a continuously linearly increasing programmed temperature cycle in the range 70° to 140° C. over a period of at least 3½ hours, one component of the initiator system having a half life of 1–15 hours at 70° C. and less than 1 hour at 100° C., a second having a half life of 1–15 hours at 100° C., and 1–4 hours at 115° C. and a third having a half life of greater than 15 hours at 100° C. and 0.1–10 hours at 130° C.

2. Process according to claim 1 where the first component is lauroyl peroxide, octanoyl peroxide, 2,4-dichlorobenzoyl peroxide or benzoyl peroxide.

3. Process according to claim 1 where the second component is 1,1, di-t-butyl peroxy-3,5,5-trimethyl cyclohexane, t-butyl peracetate, cyclohexanone peroxide or t-butyl peroxyisopropyl carbonate.

4. Process according to claim 1 where the third component is t-butyl perbenzoate, dicumyl peroxide, di-t-butyl peroxide or di-t-butyl perphthalate.

5. Process according to claim 1 where the programmed temperature ranges from 90° to 135° C.

6. Process according to claim 1 where divinylbenzene is copolymerised with the monomer.

7. Process according to claim 1 when the polymerisation is performed in an aqueous suspension.

8. Process according to claim 7 where a wetting agent is used.

9. Process according to claim 8 where the wetting agent is an anionic surface active agent, an organic sulphate or sulphonate.

10. Process according to claim 8 where the wetting agent is sodium caproate, sodium oleate, a long chain alkyl sulphate or sulphonate, an alkyl aromatic sulphonate, an aryl alkyl polyether sulphonate, a sodium salt of an alkyl phosphate or the reaction product of tertiary butyl hydroperoxide and sodium formaldehyde sulphoxylate.

11. A process for the polymerisation of an olefinically unsaturated monomer selected from the group consisting of styrene, ortho-chlorostyrene, para-chlorostyrene, dichlorostyrenes, vinyl naphthalene, methyl acrylate and ethyl acrylate which consists essentially of polymerising said olefinically unsaturated monomer under a continuously linearly increasing programmed temperature cycle in the range of 70 to 140° C. over a period of at least 3½ hours in the presence of a three component initiator system, the first component of which is selected from the group consisting of lauroyl peroxide, octanoyl peroxide, 2,4-dichlorobenzoyl peroxide and benzoyl peroxide, the second component being selected from the group consisting of 1,1-di-t-butyl peroxy-3,5,5-trimethyl cyclohexane, t-butylperacetate, cyclohexanone peroxide and t-butyl peroxyisopropyl carbonate and the third component being selected from the group consisting of t-butyl perbenzoate dicumyl peroxide, di-t-butylperoxide and di-t-butyl perphthalate.

References Cited
UNITED STATES PATENTS

| | | | |
|---|---|---|---|
| 3,480,606 | 11/1969 | Thomas | 260—85.5 P |
| 2,687,408 | 8/1954 | Grim | 260—93.5 W |
| 2,692,260 | 10/1954 | D'Alelio | 260—93.5 W |
| 2,907,756 | 10/1959 | Doak | 260—93.5 W |
| 3,293,233 | 12/1966 | Erchak et al. | 260—89.5 R |
| 3,425,966 | 2/1969 | Ronden et al. | 260—93.5 W |
| 3,491,071 | 1/1970 | Lanzo | 260—85.5 P |
| 3,585,176 | 6/1971 | Gerritsen et al. | 260—93.5 W |

HARRY WONG, JR., Primary Examiner

U.S. Cl. X.R.

260—87.5 R, 88.2 C, 89.1, 89.5 A, 89.5 AW, 91.5, 93.5 S, 93.5 W